US011624522B2

(12) United States Patent
Jones

(10) Patent No.: US 11,624,522 B2
(45) Date of Patent: Apr. 11, 2023

(54) SYSTEMS AND A METHOD FOR MAINTENANCE OF HVAC SYSTEMS

(71) Applicant: Airconnect Holdings Pty Ltd, Mackay (AU)

(72) Inventor: David Paul Jones, Mackay (AU)

(73) Assignee: AIRCONNECT HOLDINGS PTY LTD, Mackay (AU)

(*) Notice: Subject to any disclaimer, the term of this patent is extended or adjusted under 35 U.S.C. 154(b) by 306 days.

(21) Appl. No.: 16/755,714

(22) PCT Filed: Oct. 11, 2018

(86) PCT No.: PCT/AU2018/051101
§ 371 (c)(1),
(2) Date: Apr. 13, 2020

(87) PCT Pub. No.: WO2019/071312
PCT Pub. Date: Apr. 18, 2019

(65) Prior Publication Data
US 2021/0199322 A1 Jul. 1, 2021

(30) Foreign Application Priority Data
Oct. 11, 2017 (AU) .............................. 2017904105

(51) Int. Cl.
*F24F 11/32* (2018.01)
*G05B 23/02* (2006.01)

(52) U.S. Cl.
CPC ............ *F24F 11/32* (2018.01); *G05B 23/027* (2013.01); *G05B 23/0232* (2013.01); *G05B 23/0283* (2013.01); *G05B 2223/06* (2018.08)

(58) Field of Classification Search
CPC ... F24F 11/32; G05B 23/0232; G05B 23/027; G05B 23/0283; G05B 2223/06
(Continued)

(56) References Cited

U.S. PATENT DOCUMENTS 9,638,436 B2    5/2017    Arensmeier et al.
9,696,056 B1    7/2017    Rosenberg
(Continued)

FOREIGN PATENT DOCUMENTS

AU    2011265563    7/2012
CN    105066381    11/2015
(Continued)

OTHER PUBLICATIONS

European Search Report dated Sep. 15, 2021 issued in European Patent Application No. 18866915.4, 15 pp.
(Continued)

*Primary Examiner* — Jigneshkumar C Patel
(74) *Attorney, Agent, or Firm* — Nixon & Vanderhye P.C.

(57) ABSTRACT

A system for monitoring at least one HVAC system includes at least one remotely accessible server, at least one probe or sensor operatively connected to the at least one HVAC system and configured to acquire operational data, and a communication module operatively connected to the at least one probe or sensor and configured to transmit the operational data acquired to the at least one remotely accessible server. The remotely accessibly server includes a processor and a memory unit and is programmed to receive and store operational data acquired for the HVAC system, and identify any operational abnormalities by analysing the operational data. Responsive to an operational abnormality being identified, the server is further programmed to designate a tiered maintenance status for the HVAC system and transmit a corresponding tiered maintenance request to a technician based on the tiered maintenance status designated.

20 Claims, 5 Drawing Sheets

(58) Field of Classification Search
USPC .......................................... 700/276; 340/679
See application file for complete search history.

(56) References Cited

U.S. PATENT DOCUMENTS

| | | |
|---|---|---|
| 2005/0159846 A1 | 7/2005 | Van Ostrand et al. |
| 2008/0033674 A1* | 2/2008 | Nikovski ................. F24F 11/30 702/108 |
| 2013/0158714 A1* | 6/2013 | Barton ..................... F24F 11/89 700/276 |
| 2014/0260597 A1* | 9/2014 | Vogel ..................... G01D 4/008 73/198 |
| 2014/0266755 A1 | 9/2014 | Arensmeier et al. |
| 2014/0284390 A1* | 9/2014 | Teng ........................ F24F 11/00 236/51 |
| 2015/0127172 A1 | 5/2015 | Quam et al. |
| 2015/0308704 A1* | 10/2015 | Jung ................. G05B 23/0267 700/276 |
| 2015/0345821 A1 | 12/2015 | Alsaleem |
| 2016/0132816 A1* | 5/2016 | Lush .............. G06Q 10/063112 705/7.14 |
| 2016/0209059 A1 | 7/2016 | Castillo et al. |
| 2016/0209074 A1 | 7/2016 | Ito et al. |
| 2016/0370799 A1 | 12/2016 | Denton et al. |

FOREIGN PATENT DOCUMENTS

| | | |
|---|---|---|
| CN | 106016582 | 10/2016 |
| CN | 106403188 | 2/2017 |
| JP | 2008-309341 | 12/2008 |
| WO | 2010/129913 | 11/2010 |

OTHER PUBLICATIONS

International Search Report dated Nov. 29, 2018 issued in PCT International Patent Application No. PCT/AU2018/051101, 3 pp.

* cited by examiner

↙ 300

|  | AHVAC-OPSH-FOR-000 Work Order |  |
|---|---|---|
|  | Rev 1 | 01/07/2017 |

Airconnect has generated a work order for unit WEB01

| Unit Name : WEB01 | Date : 11/10/2018 | Time : 09:39 |
|---|---|---|

| Purchase Order : AHPO15820187 Work Order : AHVAC0044 |
|---|

| Client | Other |
|---|---|
| Client Site | Test Site 2 Web |
| Diagnosis | Level 1 Filter Blockage |
| Technicians Required | Airhygieneist |
| Service Ref# | PUHZ-RP100VKA2R1-A |
| Outdoor Model/Serial/Location | PUHZ-RP100VKA2, 64U06329, Behind R&D Shed |
| Indoor Model/Serial/Location | PCA-RP100KAQ, 64A03546, Left Wall R&D Shed |

This is a level 1 fault which does not require an HVAC Technician to attend. An Airhygieneist in your vicinity has been dispatched to clean your filters, please allow up to 48 hours for our arrival. Please email operations@airconstruct.com.au for any site specific requirements or instructions.

Figure 3

|  | AHVAC-OPSH-FOR-000 Work Order ||
|  | Rev 1 | 01/07/2017 |

Airconnect has generated a work order for unit WEB01

| Unit Name : WEB01 | Date : 11/10/2018 | Time : 09:39 |

| Purchase Order : AHPO15820188 Work Order : AHVAC0045 |

| Client | Other |
|---|---|
| Client Site | Test Site 2 Web |
| Diagnosis | Level 2 - Coil Blockage |
| Technicians Required | Airhygieneist |
| Service Ref# | PUHZ-RP100VKA2R1-A |
| Outdoor Model/Serial/Location | PUHZ-RP100VKA2, 64U06329, Behind R&D Shed |
| Indoor Model/Serial/Location | PCA-RP100KAQ, 64A03546, Left Wall R&D Shed |

This is a level 2 fault which does not require an HVAC Technician to attend. An Airhygieneist in your vicinity has been dispatched to clean your coil, please allow up to 48 hours for our arrival. Please email operations@airconstruct.com.au for any site specific requirements or instructions.

Figure 4

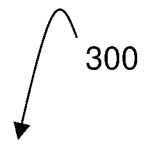

|  | AHVAC-OPSH-FOR-000 Work Order ||
|  | Rev 1 | 01/07/2017 |

Airconnect has generated a work order for unit WEB01

| Unit Name : WEB01 | Date : 11/10/2018 | Time : 09:38 |

| Purchase Order : AHPO15820189 Work Order : AHVAC0046 |

| Client | Other |
|---|---|
| Client Site | Test Site 2 Web |

| Diagnosis | Level 3 - Equipment Failure |
|---|---|
| Technicians Required | HVAC Technician |
| Service Ref# | PUHZ-RP100VKA2R1-A |
| Outdoor Model/Serial/Location | PUHZ-RP100VKA2, 64U06329, Behind R&D Shed |
| Indoor Model/Serial/Location | PCA-RP100KAQ, 64A03546, Left Wall R&D Shed |

This is a level 3 fault which requires an HVAC Technician to attend. An HVAC Technician in your vicinity has been dispatched to diagnose, please allow up to 48 hours for our arrival.
Please email operations@airconstruct.com.au for any site specific requirements or instructions.

Figure 5

SYSTEMS AND A METHOD FOR MAINTENANCE OF HVAC SYSTEMS

This application is the U.S. national phase of International Application No. PCT/AU2018/051101 filed Oct. 11, 2018 which designated the U.S. and claims priority to Australian Patent Application No. 2017904105 filed Oct. 11, 2017, the entire contents of each of which are hereby incorporated by reference.

TECHNICAL FIELD

The present invention generally relates to the maintenance of Heating, Ventilation and Air Conditioning ("HVAC") systems. In particular, the present invention concerns maintenance systems and a method for maintaining a plurality of HVAC systems.

BACKGROUND

Heating, Ventilation and Air Conditioning ("HVAC") systems require regular maintenance to ensure optimal working efficiency. The type of maintenance can range from simple filter cleaning to more advanced fault detection and correction.

Generally, HVAC systems are maintained through time-based scheduled maintenance according to manufacturer's recommendations to retain warranty coverage. Once warranty coverage concludes, HVAC systems are still typically maintained on time based scheduled maintenance.

A problem with such scheduled maintenance is that it does not account for individual variations between HVAC systems (e.g., environmental operating differences) and, consequently, it is not cost-effective.

To partly address the above problem, entities, such as, e.g., companies and organisations, with multiple HVAC systems have transitioned to condition-based maintenance in which operational data from one or more of the multiple HVAC systems is monitored and maintenance is only scheduled as required. However, existing condition-based maintenance systems for HVAC systems still have problems and/or deficiencies.

For example, U.S. Pat. No. 9,638,436 B2 discloses a condition-based maintenance system and method for HVAC systems. However, the disclosed system is specifically directed to Computer Room Air Conditioning (CRAC) units and includes a redundant step of having an HVAC technician verify the operational data monitored, which is plainly not cost-effective.

U.S. Pat. No. 9,696,056 B1 similarly discloses a condition-based maintenance system and method for HVAC systems. However, the disclosed system requires an extensive outlay in retro-fitting existing HVAC systems with sensors for monitoring and local storage of operational data. Moreover, any anomalies detected regardless of the severity of the anomaly results in a qualified HVAC technician being dispatched, which can be costly over time, particularly across multiple HVAC systems when the anomaly detected is more often than not simply a dirty filter.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide maintenance systems, an HVAC system for use with the maintenance systems and a method of maintaining at least one HVAC system, which may at least partially overcome at least one of the abovementioned problems or deficiencies or provide a consumer with a useful or commercial choice.

According to a first aspect of the present invention, there is provided a maintenance system for use with at least one HVAC system, said system including:

at least one remotely accessible server;

at least one probe operatively connected to at least one communication line of the at least one HVAC system and configured to acquire operational data transmitted along the at least one communication line; and a communication module operatively connected to the at least one probe and configured to transmit said operational data acquired to said at least one remotely accessible sever, wherein the at least one remotely accessible server includes at least one processor and at least one memory unit and is programmed to:

receive and store said operational data acquired for said at least one HVAC system;

identify any operational anomalies by analysing said operational data;

responsive to an operational anomaly being identified, designate a tiered maintenance status for said at least one HVAC system; and transmit a corresponding tiered maintenance request to a technician based on the tiered maintenance status designated for said at least one HVAC system.

According to a second aspect of the present invention, there is provided a maintenance system for use with at least one HVAC system, said system including:

at least one remotely accessible server;

at least one sensor operatively connected to the at least one HVAC system and configured to acquire operational data for the at least one HVAC system; and a communication module operatively connected to the at least one sensor and configured to transmit said operational data acquired to said at least one remotely accessible sever, wherein the at least one remotely accessible server includes at least one processor and at least one memory unit and is programmed to:

receive and store said operational data acquired for said at least one HVAC system;

identify any operational anomalies by analysing said operational data;

responsive to an operational anomaly being identified, designate a tiered maintenance status for said at least one HVAC system; and transmit a corresponding tiered maintenance request to a technician based on the tiered maintenance status designated for said at least one HVAC system.

According to a third aspect of the present invention, there is provided a maintenance system for use with at least one HVAC system, said system including at least one remotely accessible server having at least one processor to control execution of instructions from at least one memory unit and including:

a receiving component for receiving operational data from the at least one HVAC system;

a storage component for, in response to receiving the operational data acquired from the at least one HVAC system, looking up an individual HVAC system record corresponding to the at least one HVAC system in an HVAC systems database in communication with the at least one remotely accessible server and storing the operational data against the individual HVAC system record;

an anomaly-identifying component for analysing said operational data acquired and identifying any operational anomalies;

a processing component for, in response to an anomaly being identified, designating a tiered maintenance status for said at least one HVAC system; and an action component for, in response to a tiered maintenance status being designated, transmitting a corresponding tiered maintenance request to a technician based on the tiered maintenance status designated.

According to a fourth aspect of the present invention, there is provided a HVAC system including:

at least one probe or sensor operatively configured to acquire operational data of the HVAC system; and a communication module operatively connected to the at least one probe or sensor and configured to transmit said operational data acquired to the at least one remotely accessible server of the maintenance system of the first, second or third aspects.

Advantageously, the systems and method of the present invention enable a plurality of HVAC systems to be remotely monitored so that any operational anomalies may be readily identified and corrected. Moreover, by designating a tiered maintenance required status to identified anomalies and transmitting a corresponding tiered maintenance request, maintenance services are able to be efficiently and cost-effectively driven. Furthermore, the tiered maintenance required status and requests enable a suitably qualified technician to be dispatched for the anomaly meaning qualified HVAC technicians will be freed up to attend to more severe anomalies than minor anomalies, such as, e.g., a dirty filter.

The at least one HVAC system may include any suitable type of air conditioning system.

For example, in some embodiments, the at least one HVAC system may include a packaged air conditioner system.

In other embodiments, the at least one HVAC system may include any system having at least one indoor unit, at least one outdoor unit and at least one communication line extending therebetween.

Moreover, a person skilled in the art will appreciate that the system of the present invention may be applied to related systems, such as, e.g., a chiller system.

In preferred embodiments, the at least one HVAC system may have at least one indoor unit, at least one outdoor unit and at least one communication line extending therebetween The at least one HVAC system may typically be capable of modifying the condition of air to provide cooling and/or heating, preferably at least cooling.

The at least one HVAC system may be a ducted or ductless system.

The at least one HVAC system may also include a refrigeration cycle, typically extending between at least one indoor unit and at least one outdoor unit.

In preferred embodiments, the at least one HVAC system may be a ductless split-type air conditioner.

In such embodiments, the at least one outdoor unit may generally be located externally of a building structure.

The at least one outdoor unit may include an outdoor heat exchanger, a compressor, a fan and an outdoor controller for controlling the compressor and the fan. The outdoor controller may typically include a microcomputer.

The outdoor controller may be supplied with operational data such as, e.g., the temperature of the outdoor heat exchanger, refrigerant pressure, atmospheric temperature and rotational speed of the compressor and/or fan. Based on the operational data supplied and further operational data transmitted from the at least one indoor unit, the at least one outdoor unit and thus the refrigeration cycle is controlled.

The at least one indoor unit may generally be located within a building structure.

The at least one indoor unit may include an indoor heat exchanger, a fan for blowing air to the indoor heat exchanger and an indoor controller for controlling operation of the at least one indoor unit. The indoor controller may typically include a microcomputer like with the outdoor controller.

The indoor controller generally controls the at least one indoor unit based on operational data such as, e.g., the temperature of the indoor heat exchanger, settings input by a user and operational data transmitted from the at least one outdoor unit. Examples of settings input by a user include start/stop, operation mode (heat/cool), set indoor temperature, set air flow rate, and/or louvre direction and movement control.

Generally, the operational data is acquired from at least one sensor located in the at least one HVAC system.

In some embodiments, the at least one sensor may be retrofitted to the at least one HVAC system. In such embodiments, the at least one sensor may typically include a plurality of sensors each configured to acquire operational data for the at least one HVAC system.

Examples of operational data may include but are not limited to: intake pressure, discharge pressure, compressor temperature, outdoor unit expansion valve opening, indoor unit expansion valve opening, compressor current, compressor frequency, atmospheric temperature, evaporation temperature, suction temperature, suction temperature, blowout temperature, gas pipe temperature, liquid pipe temperature and set temperature.

Examples of the sensors include but are not limited to temperature sensors, humidity sensors, motion sensors, infra-red sensors, current sensors, voltage sensors, air (atmospheric) pressure sensors, flow pressure sensors, and overflow safety switch sensors.

In other embodiments, the operational data may be acquired from one or more integrated sensor located in the at least one HVAC system, typically units of the at least one HVAC system. In such embodiments, the sensors are typically integrated by the manufacturer of the at least one HVAC system.

In some embodiments, the at least one HVAC system includes at least one communication line extending between at least one indoor and at least one outdoor unit of the HVAC system. In such embodiments, the line may function as a communication medium for conveying operational data between the units. The line may also preferably be an electric power line between the units as is known in the art. This has the advantage of reducing the number of wirings required to install the at least one HVAC system.

In such embodiments, operational data may typically be exchanged between the at least one outdoor unit and the at least one indoor unit via the at least one communication line. Preferably, the operational data may be exchanged between the outdoor controller of the at least one outdoor unit and the indoor controller of the at least one indoor unit.

Additionally, the at least one communication line may convey error notifications or alerts between the units, such as, e.g., a faulty fan.

In some embodiments, the at least one communication line may include a transmission line, at least one bridge unit and/or at least one blocking filter. During signal transmission between the units, operational data to be exchanged may be converted into one or more signal pulses by a first controller and/or bridge unit for transmission along the transmission line to a second controller and/or bridge unit where the one or more signal pulses may be converted back to the operational data and processed by the second controller.

In preferred embodiments, the at least one communication line may include a network and operational data may be exchanged between the respective controllers over the network in the form of a data stream comprising network packets. The network may be a computer network or data network and may be a wired or wireless network.

Generally, the maintenance system and method of the present invention may be used with a plurality of HVAC systems.

For example, the system and the method may be used with at least about 5, at least about 10, at least about 20, at least about 30, at least about 40, at least about 50, at least about 60, at least above 70, at least about 80, at least about 90, at least about 100, at least about 110, at least about 120, at least about 130, at least about 140, at least about 150, at least about 200, at least about 250, at least about 300, at least about 350, at least about 400, at least about 450, at least about 500, at least about 550, at least about 600, at least about 650, at least about 700, at least about 750, at least about 800, at least about 850, at least about 900, at least about 950, at least about 1,000, at least about 2,000, at least about 3,000, at least about 4,000, at least about 5,000, at least about 6,000, at least about 7,000, at least about 8,000, at least about 9,000 or even at least about 10,000 HVAC systems.

The HVAC systems may include residential HVAC systems, commercial HVAC systems or a combination thereof.

The at least one remotely accessible server may be any appropriate server computer, distributed server computer, cloud-based server computer, sever computer cluster or the like. The server may typically include one or more processors and one or more memory units containing executable instructions/software to be executed by the one or more processors. Generally, the server may be in communication with at least one database.

For example, in some embodiments, the server may be in communication with a HVAC system database containing a plurality of individual HVAC system records each corresponding to an individual HVAC system. Preferably, the server may be linked to or may maintain the HVAC system database containing the plurality of individual HVAC system records.

Each individual HVAC system record may include an identifier, such as, e.g., a record/account number or username.

Each record may further include additional HVAC system information, such as, e.g., the make, the model and/or year of manufacture of the individual HVAC system.

Each record may further include account information, such as, e.g., the owner of the individual HVAC system.

Each record may also include a previous service history of the HVAC system.

The remotely accessible server is configured to receive communications from the communications module operatively connected to the at least one probe operatively connected to the at least one communication line of the at least one HVAC system and transmit communications to a computing device or electronic device of the technician.

The communications may be received and transmitted over any suitable communications network or networks.

For example, the communications may be received and transmitted over a communications network, which may include, among others, the Internet, LANs, WANs, GPRS network, a mobile-communications network, etc., and may include wired and/or wireless communications.

The communications network may be a secure communications network, such as, e.g., an encrypted communication channel such as Hypertext Transfer Protocol Secure (HTTPS), Transport Layer Security/Secure Sockets Layer (TLS/SSL) or other secure channel.

The computing device of the technician may be any suitable external processing device capable of communication with the remotely accessible server. The computing device may include at least one processor, at least one memory unit and at least one display. The computing device may be in the form of a desktop computer, a laptop computer, a tablet device, a smart phone, a smart watch or a PDA, for example.

The electronic device may include at least one processor, at least one memory unit and at least one display and be of any suitable form for receiving the request. The electronic device may be a cell phone, for example.

Communication between the electronic device and the remotely accessible server may be effected by way of Short Message Service (SMS) protocol, Unstructured Supplementary Service Data (USSD) protocol, over a secure Internet connection, or by way of data communication enabled by a software application installed on the electronic device.

The at least one probe may be of any suitable size, shape and form to be operatively connected to the at least one HVAC system and acquire operational data.

In some embodiments, the at least one probe may be operatively connected to the at least one communication line of the at least one HVAC system and may acquire operational data transmitted along the at least one communication line.

The at least one probe may preferably passively acquire the operational data such that there is no disturbance of the transmission of operational data along the at least one communication line. The at least one probe may or may not draw power from the at least one communication line.

In some embodiments, the at least one probe may be a software application configured to be run on an electronic device or computing device that is connected to the at least one communication line.

The electronic device or computing device may, as previously described, include at least one processor, at least one memory unit and at least one display. The computing device may be in the form of a desktop computer, a laptop computer, a tablet device, a smart phone, a smart watch or a PDA, for example. The electronic device or computing device may be connected to the at least one communication line in a wired or wireless arrangement.

In other embodiments, the at least one probe may be computer hardware configured to be coupled to the at least one communication line. The at least one probe may be coupled to the at least one communication line in a wired or wireless arrangement.

If wired, the at least one probe may preferably couple to the at least one communication line in an inline arrangement. For example, the at least one probe may include a lead and connectors located at each end of the lead. At least one of the connectors may be configured to be coupled in line with the at least one communication line.

In preferred embodiments, the at least one probe may be in the form a packet analyser or sniffer capable of intercepting and logging operational data in the form of packets that are exchanged along the at least one communication line.

The analyser or sniffer may be in the form of a software program or hardware, preferably the former. The analyser or sniffer may be capable of decoding each packet's raw data. The packet analyser or sniffer may be capable of intercepting and logging packets carried on a wired or wireless network between the indoor and outdoor units.

The communication module may be of any size, shape and form suitably configured to receive operational data from the at least one sensor or the at least one probe and upload the data to the remotely accessible server.

For example, in some embodiments, the communication module may be in the form of a port or access point (e.g., a USB or mini-USB port) on the at least one sensor or probe such that the sensor or the probe may be connected to a computing or electronic device using a suitable cable for uploading the operational data to the remotely accessible server.

For example, in other embodiments, the communication module may be in the form of a wireless communication module, such as, e.g., a wireless network interface controller, such that the at least one sensor or probe may wirelessly connect to the remotely accessible server through a wireless network (e.g., Wi-Fi (WLAN) communication, Satellite communication, RF communication, infrared communication, or Bluetooth™).

In yet other embodiments, the communication module may be in the form of an electronic device or computing device capable of connecting to the remotely accessible server to upload the operational data, preferably wirelessly. As previously described, the electronic device or computing device may include at least one processor, at least one memory unit and at least one display. The computing device may be in the form of a desktop computer, a laptop computer, a tablet device, a smart phone, a smart watch or a PDA, for example. The electronic device may be in the form of a cell phone, for example.

In other embodiments, the at least one probe or sensor and the communication module may be integrally formed. For example, in some such embodiments, the at least one probe may be a software application configured to be run on a communication module in the form of a computing device as described above. In some such embodiments, the communication module may preferably draw power from the at least one communication line.

As indicated above, in some embodiments, the remotely accessible server may include a receiving component for receiving operational data from the at least one HVAC system.

The operational data received may typically include an identifier, such as, e.g., a record/account number or username, to assist in identification of the at least one HVAC system.

The remotely accessible server may additionally, in some embodiments, include a storage component for, in response to receiving the operational data acquired from the at least one HVAC system, looking up an individual HVAC system record corresponding to the at least one HVAC system in an HVAC systems database in communication with the at least one remotely accessible server and storing the operational data against the individual HVAC system record.

Generally, the identifier associated with at least one HVAC system may be used to look up the individual HVAC system record corresponding to the at least one HVAC system. Typically, the storage component may look up the identifier in the HVAC systems database to locate the individual HVAC system record corresponding to the at least one HVAC system.

The storage component may store the operational data for the at least one HVAC system indefinitely or for a pre-defined period of time. For example, the pre-defined period of time may include about one day, about two days, about three days, about one week, about one fortnight, about one month, about two months, about three months, about four months, about five months, about six months, about seven months, about eight months, about nine months, about 10 months, about 11 months, about 12 months, about 18 months, about 24 months, about 36 months or even about 48 months.

The remotely accessible server may include an anomaly identifying component for analysing said operational data acquired and identifying any operational anomalies.

Any suitable analysis technique may be employed to identify operational anomalies.

For example, in some embodiments, the analysis may include comparing the operational data received and stored for the at least one HVAC system against pre-set normal operational data for the at least one HVAC system and recognising differences in operating trends to identify anomalies.

In such embodiments, the pre-set normal operational data may also be stored in the HVAC systems database.

In some such embodiments, the pre-set normal operational data may be provided in the form of normal operational data ranges and the anomaly identifying component may compare the operational data received and stored against the normal operational data ranges to at least assist in identifying any anomaly. For example, the anomaly-identifying component may identify an anomaly if an operational data value received and stored lies outside the normal operational data ranges.

In such embodiments, the analysis may include algorithms for comparing the operational data received and stored for the at least one HVAC system against pre-set normal operational data for the at least one HVAC system and for recognising differences in operating trends to identify anomalies.

In other embodiments, the analysis may include comparing the operational data received and stored for the at least one HVAC system against historical operational data received and stored for the at least one HVAC system and recognising differences in operating trends to identify anomalies.

In such embodiments, the historical operational data received and stored for the at least one HVAC system may typically also be stored in the HVAC systems database against the individual HVAC system record corresponding to the at least one HVAC system.

In such embodiments, the analysis may include algorithms for comparing the current and historical operational data and for recognising differences in operating trends to identify anomalies.

In other embodiments, the analysis may include comparing operational data received and stored for the at least one HVAC system against local environmental data for the at least one HVAC system and recognising anomalies. Examples of such anomalies include: cooling control on or heating control and no correlating change of temperature; and fan control on and no correlating change in pressure.

In such embodiments, the analysis may include algorithms for comparing operational data received and stored for the at least one HVAC system against local environmental data for the at least one HVAC system and recognising anomalies In yet other embodiments, the analysis may include analysis of operational data received and stored and recognising immediate anomaly indicators, such as, e.g., condensate drain pan overflow safety switch sensor on or a dirty air filter sensor on.

Again, the analysis in such embodiments may include algorithms for analysis of operational data received and stored and recognising immediate anomaly indicators.

Generally, the algorithms may take into account seasonal fluctuations, the age of the at least one HVAC system, the service history of the at least one HVAC system and/or previously identified anomalies when recognising differences in operating trends to identify further anomalies, particularly previously identified false-positive anomalies.

In some embodiments, the analysis may include training one or more fault detection models to learn patterns of normal operation and patterns of faulty operation. For example, the analysis may include an analysis method as disclosed in Australian Patent No. 2011265563 B2, which is hereby incorporated by reference in its entirety.

The at least one remotely accessible server may include a processing component for, in response to an anomaly being identified, designating a tiered maintenance status for said at least one HVAC system.

Generally, the tiered maintenance status designated is based on said analysis of said operational data and identification of any said anomaly.

In some embodiments, the tiered maintenance status may include a minor maintenance required designation and a major maintenance required designation.

In such embodiments, a minor maintenance required designation may be designated for minor anomalies, such as, e.g., a dirty filter sensor on. Other minor anomalies that may be designated a minor maintenance required designation may include but are not limited to: a low or high temperature sensor reading for a compressor, an evaporator, a gas pipe and/or a liquid pipe of the at least one HVAC system; and/or a high current sensor reading for a fan located in the indoor or outdoor unit of the at least one HVAC system.

A major maintenance required designation may be designated for a major anomaly, such as, e.g., an offline or non-operational said at least one HVAC system.

Of course, a person skilled in the art will appreciate that what constitutes a minor or major maintenance required designation may vary.

For example, in other embodiments, an offline at least one HVAC system may initially be designated a minor maintenance required status. In such embodiments, the offline at least one HVAC system may be elevated to a major maintenance required status if the at least one HVAC system remains offline despite receiving minor maintenance corrective action.

In some embodiments, the minor and major maintenance required designations may be further classified into three or more levels. For example, a minor maintenance required designation may be further classified into a "Level 1 Alert" and a "Level 2 Alert". A major maintenance required designation may be classified as a "Level 3 Alert".

A Level 1 Alert may be designated for identification of a single minor anomaly. For example, a Level 1 Alert may be designated for a temperature sensor detecting a low temperature reading on a heat exchanger.

A Level 2 Alert may be designated for identification of two or more minor anomalies. For example, a Level 2 Alert may be designated for a temperature sensor detecting a low temperature reading on a heat exchanger and a current sensor detecting a high current reading for a fan located in the indoor or outdoor unit of the at least one HVAC system.

In some such embodiments, a Level 3 Alert may be designated for identification of four or more minor anomalies and/or when the at least one HVAC system is non-operational or is offline.

In other such embodiments, a Level 3 Alert may only be designated when the at least one HVAC system is no longer working or is offline.

As indicated above, the at least one remotely accessible sever may include an action component for transmitting a tiered maintenance request to a technician based on the tiered maintenance status designated.

The tiered maintenance request may include a minor maintenance request or a major maintenance request. The tiered maintenance may generally correspond to the tiered maintenance status designated. For example, a minor maintenance request may be transmitted to a technician for a minor maintenance required designation. Likewise, a major maintenance request may be transmitted to a technician for a major maintenance required designation.

As indicated above, the remotely accessible server is configured to transmit the maintenance request to a computing or electronic device of the technician as described above. The maintenance request may be transmitted over any suitable communications network. For example, the maintenance request may be transmitted over a communications network, which may include among others, the Internet, LANs, WANs, GPRS network, a mobile communications network, etc., and may include wired and/or wireless communication links.

The technician is selected from a qualified cleaner and an HVAC qualified technician. Generally, the technician may be selected based on the tiered maintenance status designated. For example, the technician may be the qualified cleaner when a minor maintenance required status is designated. Likewise, the technician may be the HVAC qualified technician when a major maintenance required status is designated.

It is envisaged that the qualified cleaner may be trained in undertaking minor maintenance responsive action, such as, e.g., air filter cleaning, temperature and airflow checks, system sanitisation and/or carrying out a soft reset of the at least one HVAC system.

It will be appreciated that entities, such as, e.g., companies and organisations, with multiple HVAC systems can make considerable cost savings by having a qualified cleaner respond to minor maintenance requests rather than an HVAC qualified technician. Further advantages of having a qualified cleaner respond to minor maintenance requests rather than an HVAC qualified technician include general response time and efficiency. In particular, the use of qualified cleaners for responding to minor maintenance designations may advantageously free up HVAC qualified technicians so that they can respond to major maintenance designations.

In some embodiments, the server may be in communication with a technician database containing a plurality of technician records. Preferably, the server may be linked to or may maintain the technician database containing the plurality of technician records.

Each technician record may include a technician identifier, such as, e.g., an account number or username. Each technician record may further include additional information such as, e.g., whether the technician is a qualified cleaner or a HVAC qualified technician and/or communication details for transmitting requests, such as, e.g., a contact telephone number and/or email address.

In some embodiments, the minor and major maintenance requests may also be further classified into three or more levels. For example, a minor maintenance request may be further classified into a "Level 1 Response" and a "Level 2 Response". For completeness, a major maintenance request may be classified as a "Level 3 Response".

A Level 1 Response may be transmitted in response to a Level 1 Alert, a Level 2 Response may be transmitted in response to a Level 2 Alert, and a Level 3 Response may be transmitted in response to a Level 3 Alert.

The minor and major maintenance requests may typically be in the form of an electronic message transmitted to the computing device or electronic device of the technician. The electronic message may be a text message or email. The electronic message may include location details for the at least one HVAC system with the anomaly identified and/or contact details for the entity that owns the at least one HVAC system.

According to a fifth aspect of the present invention, there is provided a method of maintaining at least one HVAC system, said method including:

acquiring operational data for the at least one HVAC system;

transmitting said operational data acquired to at least one remotely accessible server for storage;

identifying, at the least one remotely accessible server, any operational anomalies by analysing said operational data transmitted;

responsive to an operational anomaly being identified, designating, at the at least one remotely accessible server, a tiered maintenance status for said at least one HVAC system; and transmitting a corresponding tiered maintenance request to a technician based on the tiered maintenance status designated.

The method may include one or more characteristics or features of the systems and/or the HVAC system as hereinbefore described.

The method may include an initial step of registering an account for each HVAC system with the HVAC systems database via the remotely accessible sever.

In some embodiments, the registering may additionally include fitting the at least one sensor and the communication module to the at least one HVAC system for said acquiring of operational data. In such embodiments, the acquiring may include acquiring operational data for the at least one HVAC system from the at least one sensor operatively associated with the HVAC system, preferably a plurality of sensors.

In other embodiments, the registering may additionally include associating the at least one probe and the communication module with the at least one HVAC system for said acquiring. In such embodiments, said acquiring may include acquiring operational data for the at least one HVAC system transmitted along the at least one communication line.

As indicated above, the method may preferably be used to maintain a plurality of HVAC systems, preferably each having an indoor unit, an outdoor unit and at least one communication line extending therebetween.

Said tiered maintenance status may include a minor maintenance required designation or a major maintenance required designation.

Said corresponding tiered maintenance request may likewise include a minor maintenance request or a major maintenance request.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIG. 3 is an example of a tiered maintenance request issued according to the method shown in FIG. 2;

FIG. 4 is another example of a tiered maintenance request issued according to the method shown in FIG. 2; and FIG. 5 is yet another example of a tiered maintenance request issued according to the method shown in FIG. 2.

DETAILED DESCRIPTION

Figure 1:
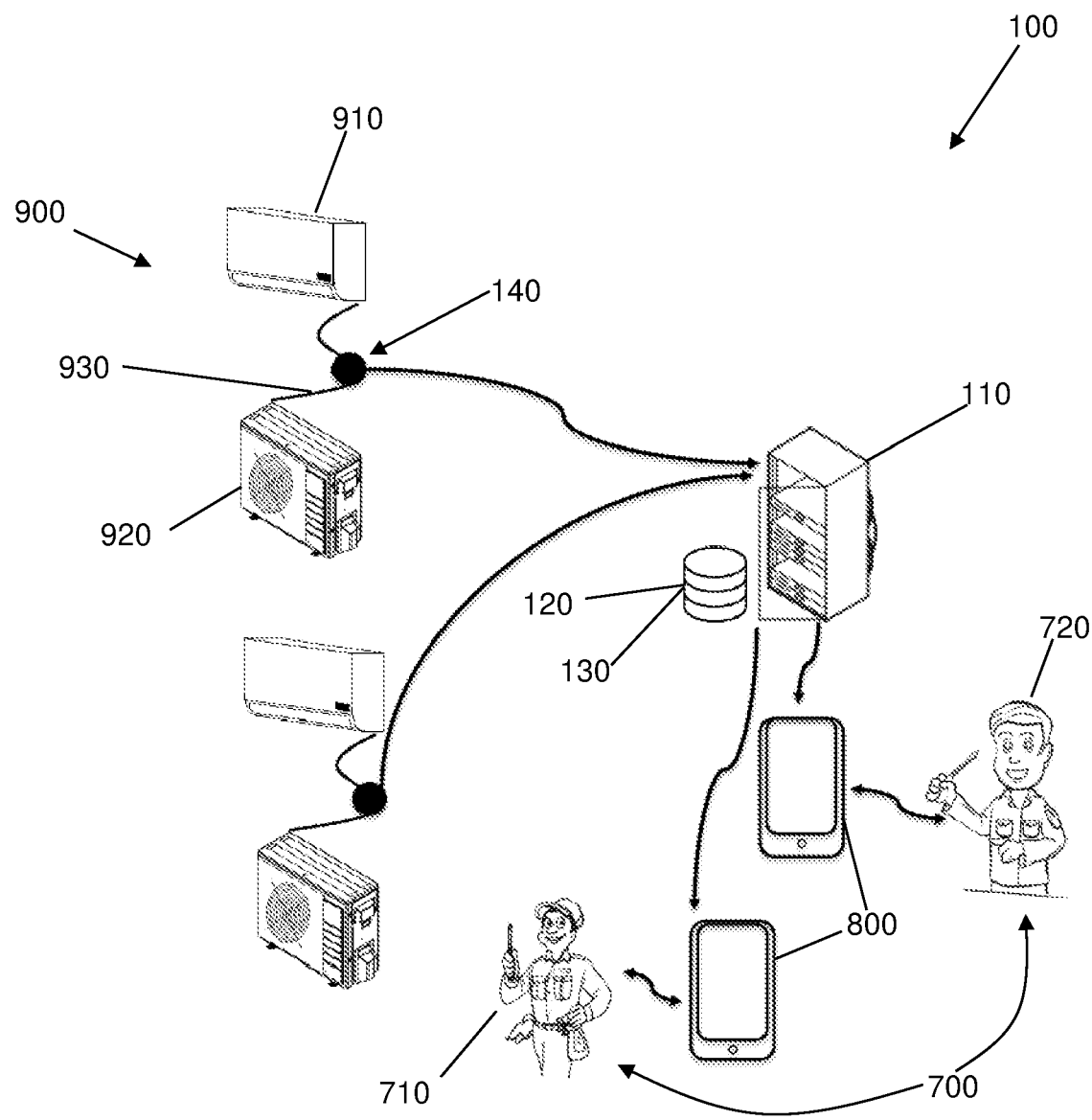
FIG. 1 illustrates a maintenance system according to an embodiment of the present invention.

FIG. 1 shows an embodiment of a maintenance system (100) for use with a plurality of HVAC systems (900). Each HVAC system (900) has an indoor unit (910), an outdoor unit (920) and a communication line (930) extending therebetween.

The maintenance system (100) includes a remotely accessible server (110), an HVAC systems database (120) and a technician database (130) in communication with the server (110) and at least one probe and communication module (140) operatively connected to the communication line (930) and configured to passively acquire operational data transmitted along the communication line (930) and transmit the operation data acquired to the server (110).

Once transmitted, the server (110) is configured to: (i) receive and store the operational data; (ii) identify any operational anomalies by analysing the operational data; (iii) responsive to identifying an operational anomaly, designate a tiered maintenance status for the HVAC system (900) selected from a Level 1 to a Level 3 Alert; and (iv) transmit a corresponding tiered maintenance request selected from a Level 1 to a Level 3 Response to a computing device (800) of a technician (700) selected from a qualified cleaner (710) and a qualified HVAC technician (720) based on the tiered maintenance status designated.

As shown, each HVAC system (900) is a ductless split-type air conditioner including the indoor unit (910), the outdoor unit (920) and the communication line (930) extending therebetween. Each HVAC system (900) also includes a refrigeration cycle (not shown) extending between the indoor unit (910) and the outdoor unit (920).

The outdoor unit (920) is generally located externally of a building structure and includes an outdoor heat exchanger, a compressor, a fan and an outdoor controller for controlling the compressor and the fan. The outdoor controller includes a microcomputer.

The outdoor controller is supplied with operational data such as, e.g., the temperature of the outdoor heat exchanger, refrigerant pressure, atmospheric temperature and rotational speed of the compressor and/or fan. Based on the operational data supplied and further operational data transmitted from the indoor unit (910), the outdoor unit (910) and thus the refrigeration cycle is controlled.

The indoor unit (910) is generally located within a building structure and includes an indoor heat exchanger, a fan for blowing air to the indoor heat exchanger and an indoor controller for controlling operation of the at least one indoor unit (910). The indoor controller includes a microcomputer like with the outdoor controller.

The indoor controller generally controls the indoor unit (910) based on operational data such as, e.g., the temperature of the indoor heat exchanger, settings input by a user and operational data transmitted from the outdoor unit (920). Examples of settings input by a user include start/stop, operation mode (heat/cool), set indoor temperature, set airflow rate, and/or louvre direction and movement control.

The communication line (930) extending between the indoor and outdoor units (910, 920) functions as a communication medium for conveying operational data between the units (910, 920). The communication line (930) also includes electric power line extending between the units (910, 920).

The operational data exchanged includes but is not limited to: intake pressure, discharge pressure, compressor temperature, outdoor unit expansion valve opening, indoor unit expansion valve opening, compressor current, compressor frequency, atmospheric temperature, evaporation temperature, suction temperature, suction temperature, blowout temperature, gas pipe temperature, liquid pipe temperature and set temperature.

Generally, the operational data is collected from one or more integrated sensors located in the units (910, 920). Examples of the sensors include but are not limited to temperature sensors, humidity sensors, motion sensors, infra-red sensors, current sensors, voltage sensors, air (atmospheric) pressure sensors, flow pressure sensors, and overflow safety switch sensors. The sensors are typically integrated by the manufacturer of the HVAC systems (900).

In the embodiment shown, the communication line (930) includes a network and the operational data is exchanged between the respective controllers over the network in the form of a data stream comprising network packets. The network is a wired computer network.

As shown, the remotely accessible server (110) can be any appropriate server computer including one or more processors and one or more memory units containing executable instructions/software to be executed by the one or more processors. The server (110) is in communication with the HVAC systems database (120) and the technician database (130) and is able to maintain both databases (120, 130).

The HVAC systems database (120) contains a plurality of individual HVAC system records. Each record includes an identifier, such as, e.g., a record/account number or username. Each record further includes HVAC system information, such as, e.g., the make, the model and/or year of manufacture of the HVAC system (900).

The technician database (130) contains a plurality of technician records. Each record includes an identifier, such as, e.g., an account number or username, and further include additional information, such as, e.g., whether the technician (700) is a qualified cleaner (710) or a HVAC qualified technician (720) and/or communication details for transmitting requests, such as, e.g., a contact telephone number and/or email address.

The remotely accessible server (110) is configured to receive communications from the at least one probe and communications module (140) operatively connected to the communication line (930) of each HVAC system (900) and transmit communications to a computing device (800) of the technician (700).

The communications are received and transmitted over any suitable communications network or networks.

For example, the communications may be received and transmitted over a communications network, which may include, among others, the Internet, LANs, WANs, GPRS network, a mobile-communications network, etc., and may include wired and/or wireless communications.

The computing device (800) of the technician (700) can be any suitable external processing device capable of communication with the remotely accessible server (110). The computing device (800) includes at least one processor, at least one memory unit and at least one display. The computing device (800) generally will be in the form of a laptop computer, a tablet device or a smart phone. The latter being the example that is shown.

The at least one probe and the communication module (140) are integrally formed with the communication module (140) being a computing device and the at least one probe being a software application run on the computing device. The at least one probe is a packet analyser or data sniffer capable of intercepting and logging data packets exchanged on the wired network between the units (910, 920) of each HVAC system (900). The computing device draws power from the communication line (930).

When operational data for each HVAC system (900) is received by the server (110) is analysed by the server (110) to identify operational anomalies.

Generally, the analysis includes the use of algorithms for comparing current and historic operational data for each HVAC system (900) and for recognising differences in operating trends to identify anomalies.

The algorithms also compare operational data received and stored for each HVAC system (900) against local environmental data for each HVAC system (900) and for recognising anomalies, including immediate anomaly indicators.

The algorithms when analysing the operational data and recognising anomalies also take into account seasonal fluctuations, the age of the HVAC system (900), the service history of the HVAC system (900) and previously identified anomalies, such as, e.g., false-positives.

Upon identifying an anomaly, the server (110) is configured to designate a tiered maintenance status depending on the severity of the anomaly identified. A minor anomaly identified, such as, e.g., a low temperature reading on a heat exchanger, is designated as a Level 1 Alert. A moderate anomaly or multiple minor anomalies, such as, e.g., a current sensor detecting a high current reading on a fan, is designated as a Level 2 Alert. A major anomaly, such as, e.g., an offline or no longer working HVAC system (900) is designated as a Level 3 Alert.

Upon designating a tiered maintenance status, the server (110) further transmits a corresponding tiered maintenance request to a technician (700). The tiered maintenance requests correspond to the tiered maintenance statuses, namely: a Level 1 Response for a Level 1 Alert, a Level 2 Response for a Level 2 Alert and a Level 3 Alert for a Level 3 Response.

The server (110) transmits the tiered maintenance requests to an appropriate technician (700) depending on the severity of the tiered maintenance status. That is, a Level 1 Response or Level 2 Response are sent to the computing device (800) of a qualified cleaner (710) and a Level 3 Response is sent to the computing device of a HVAC qualified technician (720). Advantageously, by transmitting tiered maintenance requests, the HVAC qualified technician (720) is freed from attending to minor maintenance requests and is able to attend to major maintenance requests in a timely and cost-effective manner.

The tiered maintenance request typically is in the form of an electronic message transmitted to the computing device (800) of the technician (700). The electronic message includes location details for the HVAC system (900) with the anomaly identified and/or contact details for the entity that owns the HVAC system (900).

A method (200) of using the system (100) as shown in FIG. 1 is now described in detail with reference to FIGS. 2 to 5.

Figure 2:
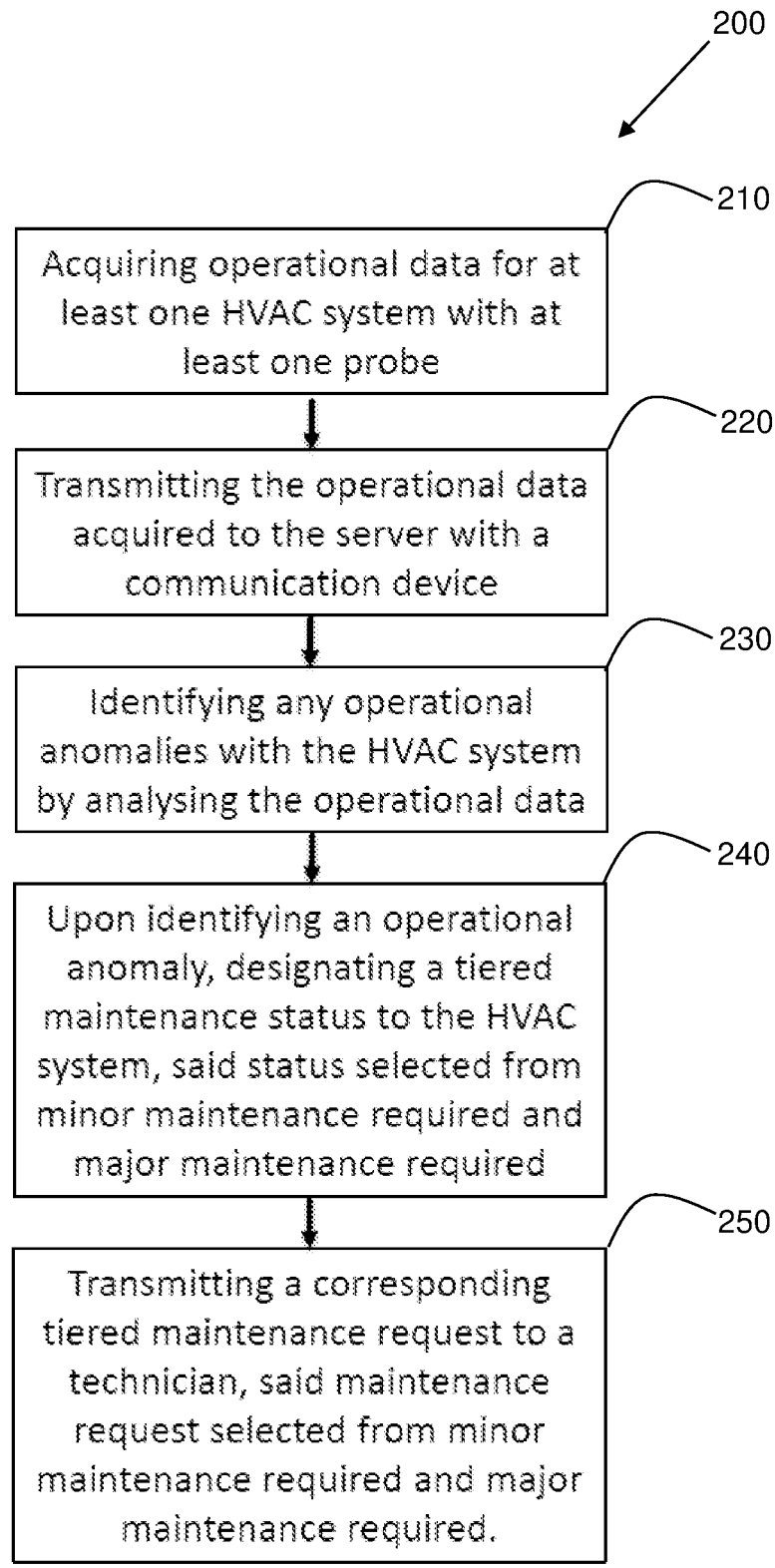
FIG. 2 is a flowchart showing steps in a method of the system shown in FIG. 1.

Referring to FIG. 2, as an initial step the method (200) includes an entity registering each of their HVAC systems (900) with the HVAC systems database (120) via the server (110). The registering includes entering information for each HVAC system (900), such as, e.g., the make, the model, the year of manufacture and/or previous service history.

The registering further includes fitting or installing the at least one probe and communication module (140) to the communication line (930) of each HVAC system (900).

At step 210, the at least one probe and communication module (140) passively acquires operational data exchanged along the communication line (930) between the indoor and outdoor units (910, 920) of a HVAC system (900).

At step 220, the at least one probe and communication module (140) wirelessly transmits the operational data acquired to the server (110) via a wireless network controller. The operational data received is stored against the individual HVAC system record in the HVAC systems database (120) corresponding to the HVAC system (900).

At step 230, the server (110) analyses the operational data received for each HVAC system (900) using algorithms to compare current operational data to historic operational data and for recognising differences in operating trends to identify anomalies.

At step 240 and upon identifying an operational anomaly, the server (110) designates a tiered maintenance required status selected from a Level 1 Alert, a Level 2 Alert and a Level 3 Alert depending on the severity of the anomaly identified.

At step 250, the server (110) transmits a corresponding tiered maintenance response to a technician (700) to attend to the HVAC system (900) and undertake restorative action.

The tiered maintenance response is selected from a Level 1 Response corresponding to a Level 1 Alert, a Level 2 Response corresponding to a Level 2 Alert and a Level 3 Response corresponding to a Level 3 Alert.

The tiered maintenance response is transmitted by the server (110) to a technician (700) depending on the tiered maintenance required status designated. A Level 1 Response or Level 2 Response is transmitted to a qualified cleaner (710) and a Level 3 Response is transmitted to a qualified HVAC technician (720).

In transmitting the tiered maintenance response, the server (110) looks up the technician database (130), identifies a technician record for a suitable technician (700) and transmits the tiered maintenance response to a computing device (800) of the suitable technician (700) based on the communication details stored on record.

FIG. 3 presents an example of a Level 1 Response work order (300) issued to a qualified cleaner (710) for a Level 1 Alert.

FIG. 4 presents an example of a Level 2 Response work order (300) issued to a qualified cleaner (710) for a Level 2 Alert.

FIG. 5 presents an example of a Level 3 Response work order (300) issued to a qualified HVAC technician (720) for a Level 3 Alert.

In the present specification and claims (if any), the word 'comprising' and its derivatives including 'comprises' and 'comprise' include each of the stated integers but does not exclude the inclusion of one or more further integers.w Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A maintenance system for use with at least one HVAC system comprising at least one indoor unit, at least one outdoor unit and at least one communication line extending therebetween, said system comprising:
   at least one remotely accessible server;
   at least one probe operatively connected to the at least one communication line of the at least one HVAC system and configured to acquire operational data transmitted along the at least one communication line, said at least one probe comprising a packet analyser configured to intercept and log the operational data in a form of packets exchanged along the at least one communication line; and
   a communication module operatively connected to the at least one probe and configured to transmit said operational data acquired to said at least one remotely accessible sever,
   wherein the at least one remotely accessible server includes at least one processor and at least one memory unit and is programmed to:
   receive and store said operational data acquired for said at least one HVAC system;
   identify any operational anomalies by analysing said operational data;
   responsive to an operational anomaly being identified, designate a tiered maintenance status for said at least one HVAC system selected from a minor maintenance required designation and a major maintenance required designation; and
   transmit a corresponding tiered maintenance request selected from a minor maintenance request and a major maintenance request to a technician based on the tiered maintenance status designated for said at least one HVAC system.

2. The system of claim 1, wherein the at least one remotely accessible server is in communication with a HVAC system database containing a plurality of individual HVAC system records each corresponding to an individual HVAC system.

3. The system of claim 1, wherein the at least one probe passively acquires the operational data transmitted along the at least one communication line of the at least one HVAC system.

4. The system of claim 2, wherein the packet analyser is capable of decoding raw data from the operational data intercepted in the form of packets exchanged along the at least one communication line of the at least one HVAC system.

5. The system of claim 1, wherein said analysing said operational data includes comparing the operational data received and stored for the at least one HVAC system against pre-set normal operational data for the at least one HVAC system and identifying differences in operating trends to identify any operational anomalies.

6. The system of claim 1, wherein the said analysing said operational data includes comparing said operational data received and stored for the at least one HVAC system against local environmental data for the at least one HVAC system and recognising any operational anomalies.

7. The system of claim 1, wherein said analysing said operational data includes analysis of said operational data received for immediate anomaly indicators.

8. The system of claim 1, wherein said analysing said operational data includes training one or more fault detection models to learn patterns of normal operation and patterns of faulty operation for the at least one HVAC system.

9. The system of claim 1, wherein said minor maintenance required designation is designated when the at least one HVAC system exhibits any one of: a low or high temperature sensor reading for a compressor, an evaporator, a gas pipe and/or a liquid pipe of the at least one HVAC system; and/or a high current sensor reading for a fan located in the at least one indoor unit or the at least one outdoor unit of the at least one HVAC system.

10. The system of claim 1, wherein said major maintenance required designation is designated when the at least one HVAC system exhibits any one of being: offline; and non-operational.

11. The system of claim 1, wherein said minor maintenance required designation is further classified into a Level 1 Alert or a Level 2 Alert.

12. The system of claim 11, wherein said at least one HVAC system is designated a Level 1 Alert when the at least one HVAC system exhibits a single minor operational anomaly.

13. The system of claim 11, wherein the said at least one HVAC system is designated a Level 2 Alert when the at least one HVAC system exhibits two or more minor operational anomalies.

14. The system of claim 1, wherein a said minor maintenance request is transmitted to a technician trained in undertaking minor maintenance responsive action.

15. The system of claim 1, wherein a said major maintenance request is transmitted to a HVAC qualified technician.

16. The system of claim 1, wherein said packet analyser is further configured to decode the operational data in the form of packets exchanged along the at least one communication line.

17. The system of claim 1, wherein the at least one probe is configured to draw power from the at least one communication line.

18. A method of maintaining at least one HVAC system comprising at least one indoor unit, at least one outdoor unit and at least one communication line extending therebetween, said method comprising:
   acquiring operational data for the at least one HVAC system from at least one probe of the HVAC system capable of intercepting and logging operational data exchanged along the at least one communication line, said at least one probe comprising a packet analyser configured to intercept and log operational data in a form of packets exchanged along the at least one communication line;
   transmitting said operational data acquired to at least one remotely accessible server for storage;
   identifying, at the at least one remotely accessible server, any operational anomalies by analysing said operational data transmitted;
   responsive to an operational anomaly being identified, designating, at the at least one remotely accessible server, a tiered maintenance status selected from a minor maintenance required designation and a major maintenance required designation for said at least one HVAC system; and
   transmitting a corresponding tiered maintenance request selected from a minor maintenance request and a major maintenance request to a technician based on the tiered maintenance status designated.

19. The method of claim 18, wherein said packet analyser is further configured to decode the operational data in the form of packets exchanged along the at least one communication line.

20. The method of claim 18, wherein the at least one probe is configured to draw power from the at least one communication line.

* * * * *